(12) United States Patent
Sawahara et al.

(10) Patent No.: US 11,132,184 B2
(45) Date of Patent: Sep. 28, 2021

(54) ENGINEERING APPARATUS, CONTROL METHOD, AND PROGRAM FOR EXECUTING A CONTROL APPLICATION

(71) Applicant: YOKOGAWA ELECTRIC CORPORATION, Tokyo (JP)

(72) Inventors: Hidenori Sawahara, Musashino (JP); Katsuhiko Toba, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/669,062

(22) Filed: Oct. 30, 2019

(65) Prior Publication Data

US 2020/0142375 A1    May 7, 2020

(30) Foreign Application Priority Data

Nov. 2, 2018 (JP) .............................. JP2018-207645

(51) Int. Cl.
| | |
|---|---|
| *G06F 8/41* | (2018.01) |
| *G05B 19/042* | (2006.01) |
| *G06F 8/30* | (2018.01) |
| *G06F 8/54* | (2018.01) |
| *G06F 9/445* | (2018.01) |

(52) U.S. Cl.
CPC ........... *G06F 8/41* (2013.01); *G05B 19/0426* (2013.01); *G06F 8/31* (2013.01); *G06F 8/54* (2013.01); *G06F 9/445* (2013.01); *G05B 2219/23008* (2013.01); *G05B 2219/23403* (2013.01)

(58) Field of Classification Search
None
See application file for complete search history.

(56) References Cited

U.S. PATENT DOCUMENTS

| | | | | |
|---|---|---|---|---|
| 7,523,023 B1 * | 4/2009 | Koh | ........................ | G06F 8/35 703/2 |
| 2003/0132964 A1 * | 7/2003 | Santori | ..................... | G09G 5/00 715/763 |

(Continued)

FOREIGN PATENT DOCUMENTS

| | | |
|---|---|---|
| JP | 07-295612 | 11/1995 |
| JP | 2001-344127 A | 12/2001 |

(Continued)

*Primary Examiner* — Qing Chen
(74) *Attorney, Agent, or Firm* — Rankin, Hill & Clark LLP (57) ABSTRACT

A portion of executable code generated from a general-purpose high-level language can be changed easily while the executable code is running. An engineering apparatus (10) of the present disclosure includes an instance management unit (103) and a compiler/linker (104). When a control application is edited while the engineering apparatus (10) and target hardware (20) are connected online, the instance management unit (103) generates a list for control application switching and a program for control application switching. The list and the program are generated from the control application and expressed in a second programming language. The compiler/linker (104) generates executable code based on the list, the program, and a control service program. When the executable code is downloaded onto the target hardware (20), the control service program causes the program for control application switching to be executed on the target hardware (20).

5 Claims, 7 Drawing Sheets

(56) References Cited

U.S. PATENT DOCUMENTS

| | | | |
|---|---|---|---|
| 2005/0066320 A1 | 3/2005 | Petig et al. | |
| 2010/0192122 A1 | 7/2010 | Esfahan et al. | |
| 2011/0138353 A1* | 6/2011 | Niere | G05B 19/0426 717/104 |
| 2014/0075409 A1* | 3/2014 | Fischer | G06F 8/41 717/105 |
| 2014/0298305 A1* | 10/2014 | Shiba | G06F 9/4552 717/148 |

FOREIGN PATENT DOCUMENTS

| | | |
|---|---|---|
| JP | 2002-99312 A | 4/2002 |
| JP | 2005-56415 A | 3/2005 |
| JP | 2005-135414 A | 5/2005 |
| JP | 2008-33570 A | 2/2008 |
| JP | 2015-125713 A | 7/2015 |
| KR | 101383793 B1 | 4/2014 |
| WO | 2012/157082 A1 | 11/2012 |

\* cited by examiner

ENGINEERING APPARATUS, CONTROL METHOD, AND PROGRAM FOR EXECUTING A CONTROL APPLICATION

CROSS-REFERENCE TO RELATED APPLICATION

The present application claims priority to and the benefit of Japanese Patent Application No. 2018-207645 filed Nov. 2, 2018, the entire contents of which are incorporated herein by reference.

TECHNICAL FIELD

The present disclosure relates to an engineering apparatus, a control method of an engineering apparatus, and a program.

BACKGROUND

A control system for controlling the production process and production facilities at a production site or the like has been developed.

In recent years, control systems have come to control a variety of devices. The devices controllable by a control system include a distributed control system (DCS), a programmable logic controller (PLC), a general-purpose personal computer, a gateway with a computing function, an intelligent sensor/actuator, a cloud computer, a fog computer, and the like.

The devices targeted for control (target hardware) in the control system are controlled by a control application.

The control application is normally created using an editor or the like in a development environment corresponding to the target hardware that is to be controlled. The editor supports a programming language for developing the control application. Examples include a ladder editor, a flowchart editor, and a script editor.

The control application is normally converted with a compiler or the like into executable code that can be directly executed by a processor of the target hardware. The executable code is stored in a memory inside the target hardware. The target hardware uses a processor to interpret and execute the executable code stored in the memory.

The development environment for creating the control application is specialized for the target hardware that is to be controlled, and the development environment often differs for each piece of target hardware. When the development environment is device dependent in this way, the operator needs to be proficient in a variety of development environments. This may reduce the engineering efficiency.

To address such device dependency of the development environment, the user program of the application needs to be made executable without dependence on the device, and an equivalent debugging function needs to be provided for applications written in a plurality of description languages. Patent literature (PTL) 1 discloses one method of addressing device dependency of the user program. This method converts a device-dependent sequence instruction program (control application) into a program written in a general-purpose high-level language. In PTL 1, the program written in a high-level language is compiled on the development environment to generate executable code.

CITATION LIST

Patent Literature

PTL 1: JPH7-295612A

SUMMARY

An engineering apparatus according to an embodiment is for generating executable code from a control application, created in a first programming language, for controlling target hardware, the executable code causing the target hardware to operate. The engineering apparatus includes an instance management unit and at least one of a compiler or a linker. When the control application is edited while the engineering apparatus and the target hardware are connected online, the instance management unit generates a list for control application switching and a program for control application switching, the list and the program being generated from the control application and expressed in a second programming language. The at least one of the compiler or the linker generates the executable code based on the list, the program, and a control service program. When the executable code is downloaded onto the target hardware, the control service program causes the program for control application switching to be executed on the target hardware.

A control method according to an embodiment is a control method of an engineering apparatus for generating executable code from a control application, created in a first programming language, for controlling target hardware, the executable code causing the target hardware to operate. The control method includes generating, when the control application is edited while the engineering apparatus and the target hardware are connected online, a list for control application switching and a program for control application switching, the list and the program being generated from the control application and expressed in a second programming language. The control method also includes generating the executable code based on the list, the program, and a control service program. When the executable code is downloaded onto the target hardware, the control service program causes the program for control application switching to be executed on the target hardware.

A program according to an embodiment is a program to control an engineering apparatus for generating executable code from a control application, created in a first programming language, for controlling target hardware, the executable code causing the target hardware to operate. The program causes the engineering apparatus to generate, when the control application is edited while the engineering apparatus and the target hardware are connected online, a list for control application switching and a program for control application switching, the list and the program for control application switching being generated from the control application and expressed in a second programming language. The program also causes the engineering apparatus to generate the executable code based on the list, the program for control application switching, and a control service program. When the executable code is downloaded onto the target hardware, the control service program causes the program for control application switching to be executed on the target hardware.

DETAILED DESCRIPTION

If a device-dependent control application is first converted to a general-purpose high-level language and then compiled to generate executable code, for example as in PTL 1, then the generated executable code becomes a chunk of machine language to be executed on the target hardware.

The control application normally includes a plurality of function blocks. If a portion of the plurality of function blocks is changed and converted to a general-purpose high-level language, and the control application expressed in the high-level language is compiled to generate executable code, then the instruction code position, variable data position, and the like of other unchanged function blocks may change.

Accordingly, when executable code is generated after first converting to a general-purpose high-level language, it is difficult to change a portion of executable code that is running without stopping the executable code.

The present disclosure therefore aims to provide an engineering apparatus, a control method of an engineering apparatus, and a program that allow a portion of executable code generated from a general-purpose high-level language to be changed easily while the executable code is running.

An engineering apparatus according to an embodiment is for generating executable code from a control application, created in a first programming language, for controlling target hardware, the executable code causing the target hardware to operate. The engineering apparatus includes an instance management unit and a compiler/linker. When the control application is edited while the engineering apparatus and the target hardware are connected online, the instance management unit generates a list for control application switching and a program for control application switching, the list and the program being generated from the control application and expressed in a second programming language. The compiler/linker generates the executable code based on the list, the program, and a control service program. When the executable code is downloaded onto the target hardware, the control service program causes the program for control application switching to be executed on the target hardware. This engineering apparatus allows a portion of executable code generated from a general-purpose high-level language (second programming language) to be changed easily while the executable code is running.

In the engineering apparatus according to an embodiment, the list for control application switching may include an instance list having size information of function block instances included in the control application and an edit instance list having information related to a changed function block instance among the function block instances included in the control application. Such inclusion of an instance list having size information of function block instances included in the control application and an edit instance list including information related to a changed function block instance among the function block instances included in the control application allows the information of the changed function block instance to be acquired.

In the engineering apparatus according to an embodiment, the program for control application switching may include an instance allocation program configured to manage memory areas where the function block instances are stored in a memory of the target hardware and a data copy program configured to copy inherited data for the changed function block instance from a memory area where the changed function block instance was stored before being changed to a memory area where the changed function block instance is stored after being changed. This inclusion of an instance allocation program configured to manage memory areas where the function block instances are stored in a memory of the target hardware, and a data copy program configured to copy inherited data for the changed function block instance from a memory area where the changed function block instance was stored before being changed to a memory area where the changed function block instance is stored after being changed, allows inherited data to be copied from the memory area where the changed function block instance was stored before being changed to the memory area where the changed function block instance is stored after being changed.

In the engineering apparatus according to an embodiment, the control service program may be configured to reallocate a memory area during idle time when the executable code is not being executed on the target hardware, the memory area being free space where the changed function block instance was stored before being changed. When the control service program reallocates a memory area corresponding to the changed function block instance in this way, consumption of memory of the target hardware can be reduced.

A control method according to an embodiment is a control method of an engineering apparatus for generating executable code from a control application, created in a first programming language, for controlling target hardware, the executable code causing the target hardware to operate. The control method includes generating, when the control application is edited while the engineering apparatus and the target hardware are connected online, a list for control application switching and a program for control application switching, the list and the program being generated from the control application and expressed in a second programming language. The control method also includes generating the executable code based on the list, the program, and a control service program. When the executable code is downloaded onto the target hardware, the control service program causes the program for control application switching to be executed on the target hardware. This control method of an engineering apparatus allows a portion of executable code generated from a general-purpose high-level language (second programming language) to be changed easily while the executable code is running.

A program according to an embodiment is a program to control an engineering apparatus for generating executable code from a control application, created in a first programming language, for controlling target hardware, the executable code causing the target hardware to operate. The program causes the engineering apparatus to generate, when the control application is edited while the engineering apparatus and the target hardware are connected online, a list for control application switching and a program for control application switching, the list and the program for control application switching being generated from the control application and expressed in a second programming language. The program also causes the engineering apparatus to generate the executable code based on the list, the program for control application switching, and a control service program. When the executable code is downloaded onto the target hardware, the control service program causes the program for control application switching to be executed on the target hardware. This program allows a portion of executable code generated from a general-purpose high-level language (second programming language) to be changed easily while the executable code is running.

The present disclosure can provide an engineering apparatus, a control method of an engineering apparatus, and a program that allow a portion of executable code generated from a general-purpose high-level language to be changed easily while the executable code is running.

Embodiments of the present disclosure are described below with reference to the drawings.

Figure 1:
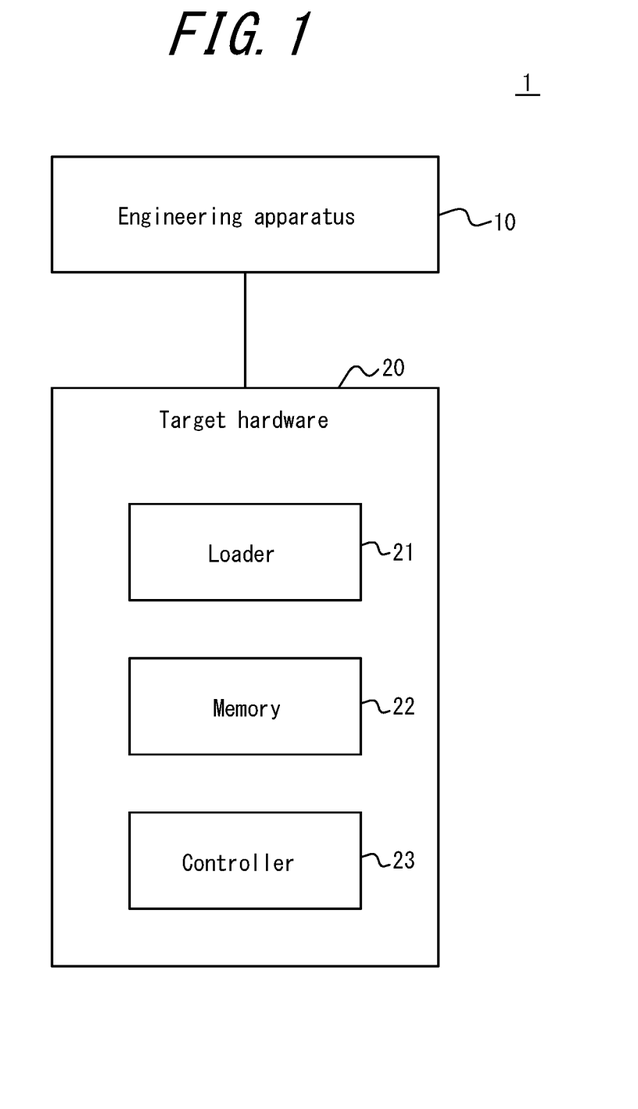
FIG. 1 illustrates an example configuration of a control system that includes an engineering apparatus according to an embodiment.

FIG. 1 illustrates an example configuration of a control system 1 that includes an engineering apparatus 10 according to an embodiment. The control system 1 includes an engineering apparatus 10 and target hardware 20. One piece of target hardware 20 is illustrated in FIG. 1, but the control system 1 may include two or more pieces of target hardware 20.

The engineering apparatus 10 generates executable code directly executable by the target hardware 20 from a control application, created in a first programming language, for controlling the target hardware 20.

The first programming language may be any appropriate language, such as a graphical user interface (GUI) based programming language, a text-based programming language, or a script-based programming language. The first programming language is preferably one of the programming languages defined by IEC 61131-3, which is a PLC standard. IEC 61131-3 defines programming languages such as ladder diagram, function block diagram, structured text, instruction list, and sequential function chart.

The target hardware 20 is a device controlled by the executable code generated by the engineering apparatus 10. The target hardware 20 periodically executes the executable code, which is downloaded from the engineering apparatus 10, as a task or thread. The target hardware 20 may execute the executable code on an event-driven basis. Execution conditions on the task may be set by the user via task settings.

The target hardware 20 may be a variety of devices that have a general-purpose computing function. Examples of the target hardware 20 include PLC, DCS, a temperature controller, a recorder, supervisory control and data acquisition (SCADA), and virtual DCS/PLC.

As illustrated in FIG. 1, the target hardware 20 includes a loader 21, a memory 22, and a controller 23.

The loader 21 downloads the executable code generated by the engineering apparatus 10 from the engineering apparatus 10 and stores the downloaded executable code in the memory 22.

The memory 22 may include any storage apparatus, such as a hard disk drive (HDD), a solid state drive (SSD), an electrically erasable programmable read-only memory (EEPROM), a read-only memory (ROM), a random access memory (RAM), or the like. The memory 22 may, for example, function as a main storage apparatus, an auxiliary memory apparatus, or a cache memory. The memory 22 is not limited to being internal to the target hardware 20 and may be an external storage apparatus connected through a digital input/output port or the like, such as a universal serial bus (USB).

The memory 22 stores the executable code downloaded from the engineering apparatus 10 by the loader 21.

The controller 23 controls each component of the target hardware 20. The controller 23 may be configured as a processor, such as a central processing unit (CPU).

The controller 23 interprets the executable code stored in the memory 22 and executes the various processes.

Figure 2:
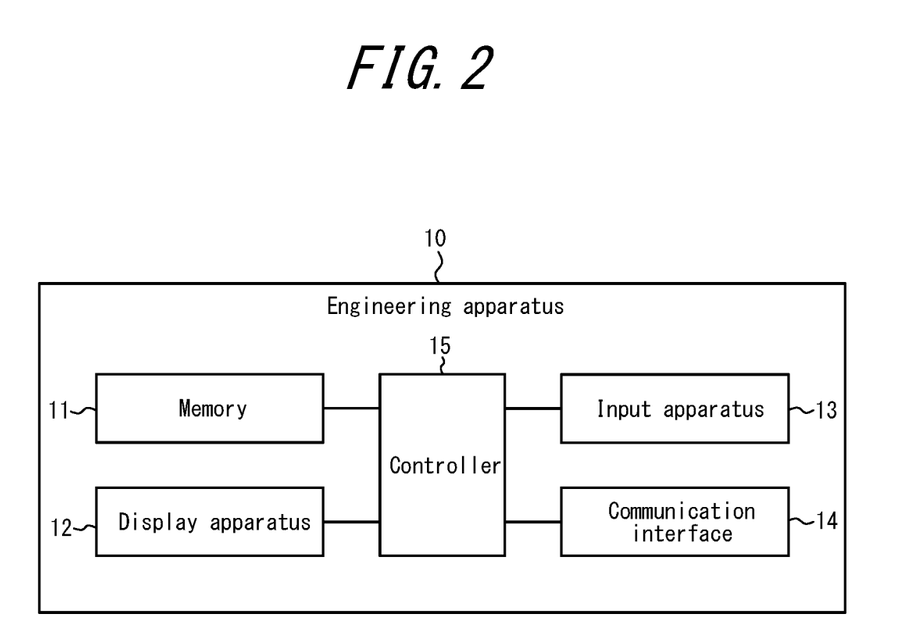
FIG. 2 illustrates an example hardware configuration of an engineering apparatus according to an embodiment.

FIG. 2 illustrates an example hardware configuration of the engineering apparatus 10 according to an embodiment.

The engineering apparatus 10 includes a memory 11, a display apparatus 12, an input apparatus 13, a communication interface 14, and a controller 15. The engineering apparatus 10 may, for example, be a server, a general-purpose computer such as a desktop PC, a factory computer, an apparatus such as a PLC, a laptop computer, a tablet, or the like.

The memory 11 may include any storage apparatus, such as an HDD, SSD, EEPROM, ROM, RAM, or the like. The memory 11 may, for example, function as a main storage apparatus, an auxiliary memory apparatus, or a cache memory. The memory 11 is not limited to being internal to the engineering apparatus 10 and may be an external storage apparatus connected through a digital input/output port or the like, such as USB. The memory 11 stores various information and programs necessary for operation of the engineering apparatus 10.

The display apparatus 12 displays various information. The display apparatus 12 may, for example, be a liquid crystal display. The display apparatus 12 may be implemented in various forms, such as a head-mounted display, a glasses-mounted display, or a watch-mounted display.

The input apparatus 13 receives input from the user to the engineering apparatus 10. The input apparatus 13 is, for example, a keyboard and/or a mouse. The input apparatus 13 may be a microphone for inputting audio information, a camera for inputting image information, or the like. The input apparatus 13 may be a touch panel. In this case, the input apparatus 13 may also function as the display apparatus 12.

The communication interface 14 communicates with the target hardware 20 of FIG. 1 by wired or wireless communication. The communication interface 14 may, for example, communicate with the target hardware 20 by the Ethernet® standard (Ethernet is a registered trademark in Japan, other countries, or both). The communication interface 14 may, for example, support USB. In this case, the engineering apparatus 10 and the target hardware 20 may, for example, be connected by a USB cable.

The controller 15 controls each component of the engineering apparatus 10. The controller 15 may, for example, be configured by a processor such as a CPU. The programs executed by the processor may, for example, be stored in a memory included in the controller 15 or may be stored in the memory 11.

Figure 3:
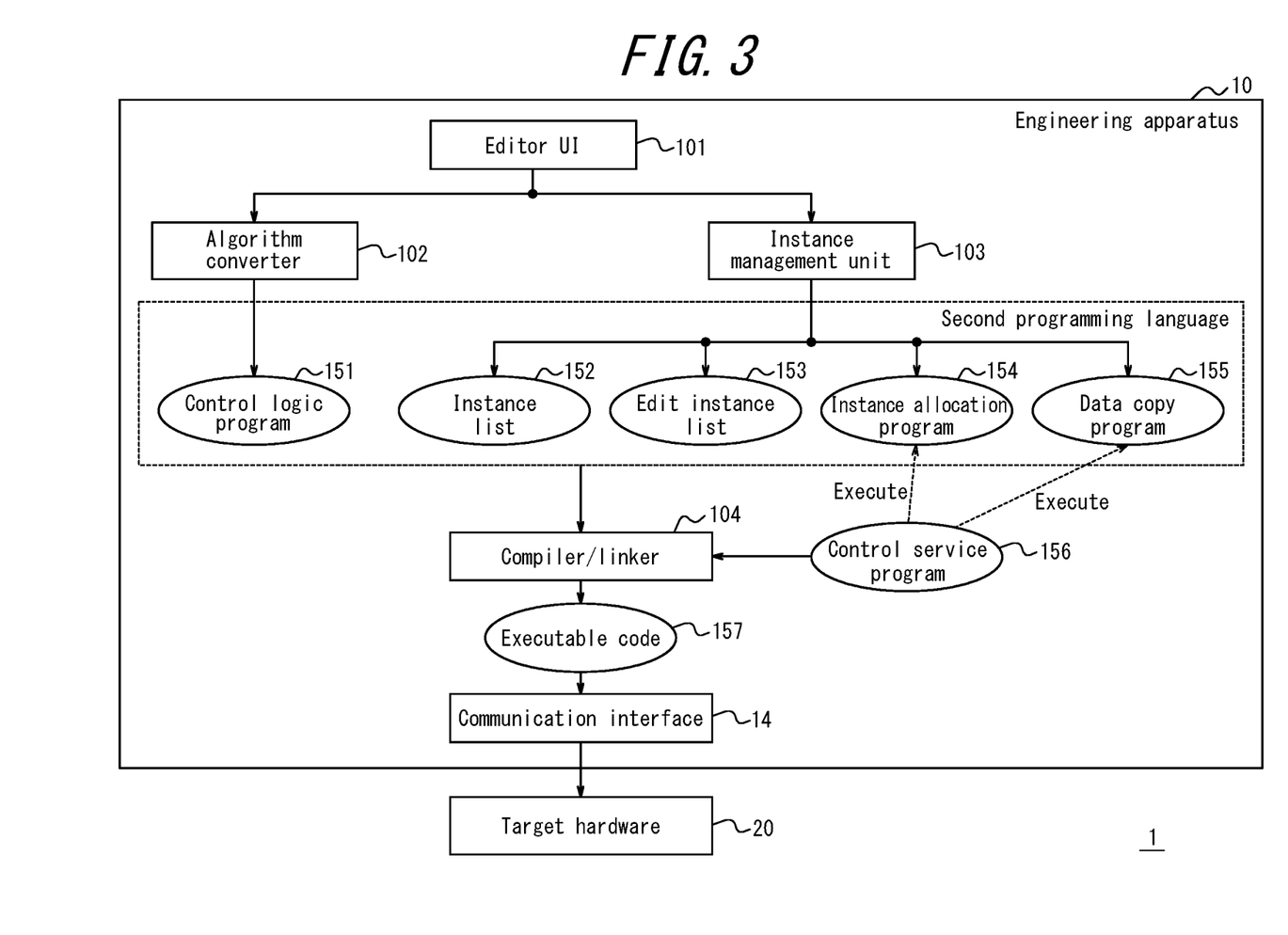
FIG. 3 illustrates operations of an engineering apparatus according to an embodiment.

Next, operations of the engineering apparatus 10 are described with reference to the control system 1 illustrated in FIG. 3. The control system 1 illustrated in FIG. 3 corresponds to the control system 1 illustrated in FIG. 1. In FIG. 3, the inside of the engineering apparatus 10 is represented in functional terms.

The engineering apparatus 10 includes an editor user interface (UI) 101, an algorithm converter 102, an instance management unit 103, and a compiler/linker 104 as function blocks. The functions of the editor UI 101, algorithm converter 102, instance management unit 103, and compiler/linker 104 may be executed by the controller 15 and the like illustrated in FIG. 2.

The engineering apparatus 10 includes a control service program 156 as data storable in the memory 11 illustrated in FIG. 2.

The editor UI 101 is a language editor for developing a control application for controlling the target hardware 20. The editor UI 101 allows the control application to be created in the above-described first programming language.

The user of the engineering apparatus 10 may edit the control application using the editor UI 101 while the engineering apparatus 10 and the target hardware 20 are connected online. Here, the engineering apparatus 10 and the target hardware 20 being connected online refers to the engineering apparatus 10 and the target hardware 20 being communicably connected.

The algorithm converter 102 converts control logic included in the control application created with the editor UI 101 into a control logic program 151 expressed in a second programming language. The second programming language may be any programming language, such as a general-purpose high-level language. The second programming language may, for example, be C, C++, or the like.

When the control application is edited while the engineering apparatus 10 and the target hardware 20 are connected online, the instance management unit 103 generates an instance list 152 and an edit instance list 153 based on the control application. The instance list 152 and the edit instance list 153 are lists for switching, on the target hardware 20, from executable code 157 based on the control application before the change to executable code 157 based on the control application after the change. The instance management unit 103 outputs the instance list 152 and the edit instance list 153 as code expressed in the second programming language.

Furthermore, when the control application is edited while the engineering apparatus 10 and the target hardware 20 are connected online, the instance management unit 103 generates an instance allocation program 154 and a data copy program 155 based on the control application. The instance allocation program 154 and the data copy program 155 are programs for switching, on the target hardware 20, from the executable code 157 based on the control application before the change to the executable code 157 based on the control application after the change. The instance management unit 103 outputs the instance allocation program 154 and the data copy program 155 as code expressed in the second programming language.

The instance list 152 includes size information of each function block instance for the list of function block instances included in the control application.

The edit instance list 153 includes information related to the changed function block instance among the function block instances included in the control application. In greater detail, the edit instance list 153 includes the number of the changed function block instance. The edit instance list 153 also includes the address of a data copy function for copying inherited data of the changed function block instance.

The instance allocation program 154 manages the memory areas where function block instances are stored in the memory 22 of the target hardware 20. In greater detail, the instance allocation program 154 associates a pointer to the position of each function block instance (which may be represented as a pointer to a pointer) and an instance address table. The "instance address table" is a table storing an address list of actual positions of the function block instances in the memory 22 of the target hardware 20.

The data copy program 155 is a program that includes a function group (data copy function group) for copying inherited data, for a changed function block instance, from the memory area where the function block instance was stored before the change to the memory area where the function block instance is stored after the change.

The compiler/linker 104 compiles the instance list 152, edit instance list 153, instance allocation program 154, and data copy program 155 that are expressed in the second programming language to generate executable code 157. The executable code 157 is directly executable by the target hardware 20.

When the compiler/linker 104 compiles the instance list 152, edit instance list 153, instance allocation program 154, and data copy program 155, the compiler/linker 104 may also link the control service program 156 to generate the executable code 157.

The compiler/linker 104 may be a general-purpose compiler/linker.

When the executable code 157 is downloaded onto the target hardware 20, the control service program 156 causes the instance allocation program 154 and the data copy program 155 to be executed on the target hardware 20.

The control service program 156 is precompiled for the corresponding target hardware 20 and stored in the memory 11 of the engineering apparatus 10. The control service program 156 may be installed on the target hardware 20 in advance as firmware of the target hardware 20.

The communication interface 14 corresponds to the communication interface 14 in FIG. 2. The executable code 157 is downloaded onto the target hardware 20 via the communication interface 14.

Next, operations of the engineering apparatus 10 are described in greater detail with concrete examples.

A control application created using the editor UI 101 is created in units of function blocks or the like for each function. The control application is configured overall by the combination of the function blocks. The function block includes data, such as local variables, input/output variables, and the like, and a control program.

The overall control application operates by the function blocks combined in this way being executed on the target hardware 20.

The instance list 152, edit instance list 153, instance allocation program 154, data copy program 155, and the like outputted by the instance management unit 103 are described with reference to FIG. 4.

Figure 4:
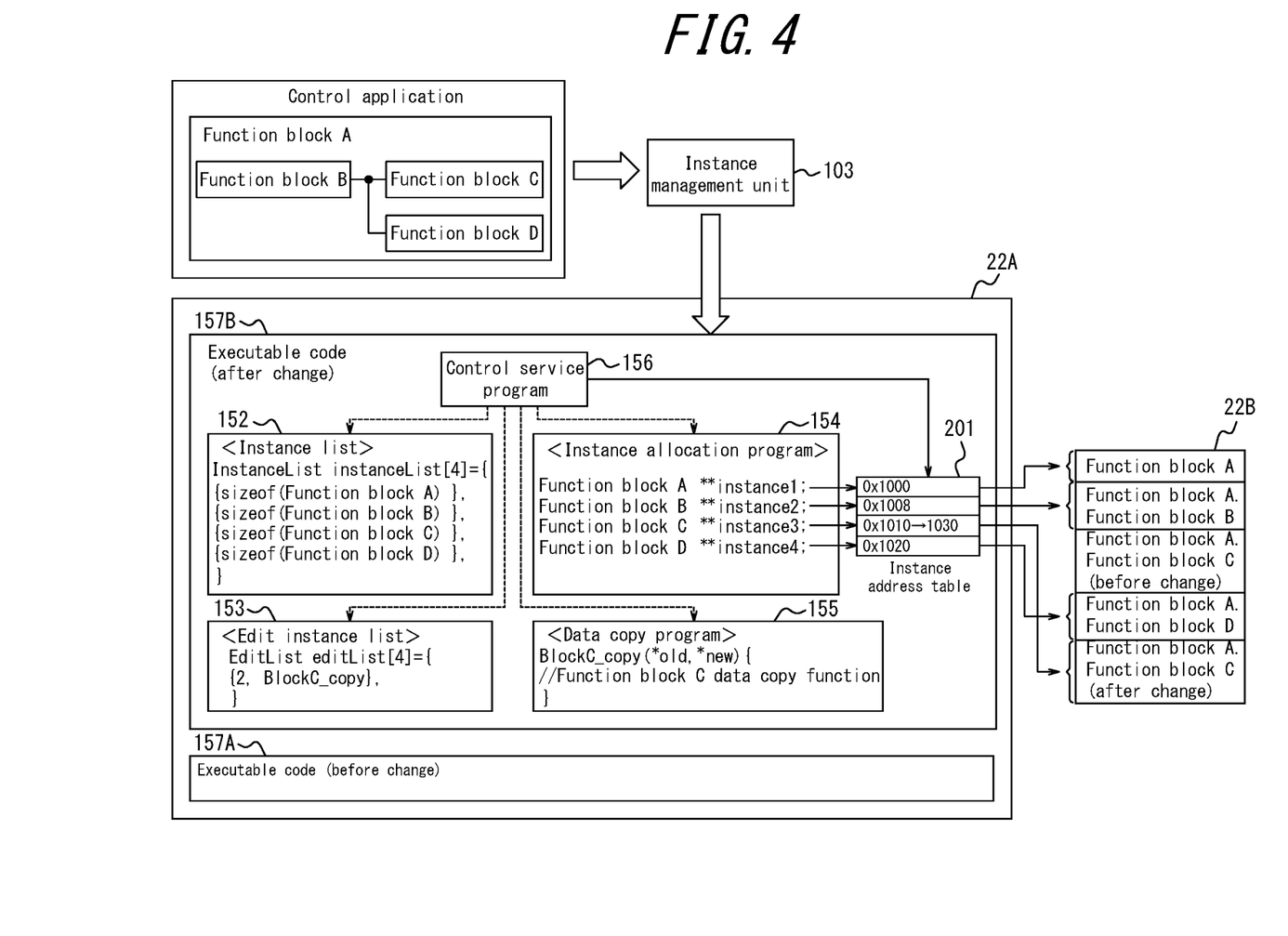
FIG. 4 illustrates example operations of executable code.

The program memory 22A inside the target hardware illustrated in FIG. 4 corresponds to the area, in the memory 22 of the target hardware 20, that is being used for storing programs. The data memory 22B inside the target hardware illustrated in FIG. 4 corresponds to the area, in the memory 22 of the target hardware 20, that is being used for storing data.

FIG. 4 illustrates the state in which the executable code 157B after the change has been downloaded to the program memory 22A in the target hardware. At this time, the executable code 157A before the change may also be stored as is in the program memory 22A in the target hardware. The content of the executable code 157A before the change is not depicted in FIG. 4.

When the executable code 157B after the change is generated from the control application after the change on the engineering apparatus 10, the instance management unit 103 generates the instance list 152, the edit instance list 153, the instance allocation program 154, and the data copy program 155.

The instance list 152 includes size information of all of the function block instances included in the control application. The instance list 152 may be represented as an array having the size of each function block instance.

The instance allocation program 154 allocates each function block instance to an instance address table 201. The instance address table 201 is a table storing the address of each function block instance in the memory 22 of the target hardware 20.

The location of each function block instance in the instance allocation program 154 is represented by a pointer to a pointer. For example, the location of the instance of function block A is represented as "**instance1". The control logic program 151 illustrated in FIG. 3 accesses the data of each function block instance via this pointer to a pointer.

The addresses in the instance address table 201 are undetermined at the stage when the executable code 157 is generated on the engineering apparatus 10. When the executable code 157 downloaded onto the target hardware 20 is run, the control service program 156 included in the executable code 157 stores the address in the instance address table 201.

The control service program 156 refers to the instance list 152 and secures a memory area of the size of each function block instance in the memory 22 of the target hardware 20. The control service program 156 stores the address, in the memory area secured in the memory 22 of the target hardware 20, at the top of each function block instance in the instance address table 201.

In this way, the control service program 156 stores addresses in the instance address table 201 at the time of execution of the executable code 157 on the target hardware 20. This makes it unnecessary to store addresses in the instance address table 201 at the time of generation of the executable code 157 on the engineering apparatus 10.

The control logic program 151 can refer to the addresses stored in the instance address table 201 at the time of execution of the executable code 157 on the target hardware 20 and access the appropriate position of each function block instance.

After the executable code 157 is downloaded onto the target hardware 20, the control service program 156 refers to the instance list 152 and secures a memory area of the size of each function block instance in the memory 22 of the target hardware 20. The control service program 156 then stores the addresses of the secured function block instances in the instance address table 201. In this way, the control service program 156 can allocate each function block instance to the memory 22 of the target hardware 20.

Next, operations when the engineering apparatus 10 and the target hardware 20 are connected online are described. When a function block in the control application on the engineering apparatus 10 is changed, the operations described below reflect the change to the function block while allowing the executable code 157B after the change, downloaded onto the target hardware 20, to inherit the values of variable data of the executable code 157A before the change.

FIG. 4 illustrates an example in which the content of function block C included in the control application is changed with the editor UI 101.

The instance management unit 103 detects a list of function block instances affected by the change to the function block. The list of function block instances affected by the change to the function block refers specifically to a list of all of the function block instances belonging to the changed function block. The instance management unit 103 generates the edit instance list 153 based on the detected list of function block instances affected by the change to the function block.

The edit instance list 153 includes information indicating the number, in the array of the instance list 152, of each function block instance affected by the change to the function block. In the example in FIG. 4, the edit instance list 153 includes the information "2", because function block C is changed. The numbering of the array of the instance list 152 begins at "0". The instance list 152 has the numbers 0 to 3 as the numbers of the array.

The edit instance list 153 further includes information on the address of the data copy function for each function block instance. In the example in FIG. 4, the edit instance list 153 includes information on the address of the data copy function "BlockC_copy".

The data copy program 155 includes a data copy function to copy inherited data from the memory area before the change to the memory area after the change for the changed function block instance. In the example illustrated in FIG. 4, the data copy program 155 includes the function "BlockC_copy(*old,*new)".

The instance list 152, edit instance list 153, instance allocation program 154, data copy program 155, and control service program 156 are compiled and linked together on the engineering apparatus 10 and converted into executable code 157.

When the executable code 157B, after the change, generated in this way is downloaded onto the target hardware 20, the control service program 156 included in the executable code 157A before the change switches the executable code 157 running on the target hardware 20 from the executable code 157A to the executable code 157B during idle time when a task is not running.

When running the executable code 157 as a task on the target hardware 20, the control service program 156 controls operations of the executable code 157 under user-designated conditions. User-designated conditions are conditions such as running the executable code 157 in a 100 ms cycle.

Since the control service program 156 causes the executable code 157 to run under user-designated conditions in this way, the control service program 156 can detect the timing when the executable code 157 is not being executed and can execute the process to switch from the executable code 157A before the change to the executable code 157B after the change. The engineering apparatus 10 can thereby minimize the length of time during which neither the executable code 157A before the change nor the executable code 157B after the change is running and can quickly switch to the executable code 157B after the change.

The control service program 156 included in the executable code 157B after the change refers to the edit instance list 153 and secures a new memory area for the changed function block instance in the memory 22 of the target hardware 20.

Based on the address of the secured memory area, the control service program 156 updates the address stored in the instance address table 201. In the example illustrated in FIG. 4, the address of the function block instance corresponding to function block C in the instance address table 201 is changed from "0x1010" to "0x1030".

The addresses of unchanged function block instances are not changed at this time in the instance address table 201. In other words, the memory areas where the unchanged function block instances are stored in the memory 22 of the target hardware 20 are the same before and after the change to the executable code 157. Consumption of the memory 22 of the target hardware 20 can therefore be reduced.

The control service program 156 passes the top address of the old memory area and the top address of the new memory area of the changed function block instance to the corresponding data copy function in the data copy program 155. In the example of FIG. 4, the control service program 156 passes "0x1010", the top address of the old memory area, and "0x1030", the top address of the new memory area, to the data copy function "BlockC_copy(*old,*new)" in the data copy program 155.

The data copy program 155 executes a copy process for inheriting data from the old memory area to the new memory area.

Subsequently, when the control service program 156 causes the control logic program 151 included in the executable code 157B after the change to be executed, the control logic program 151 after the change inherits the variable data that was used by the control logic program 151 before the change. The executable code 157B after the change, in which a portion of the function blocks was changed, can thereby operate in a state that continues operations of the executable code 157A before the change.

Figure 5:
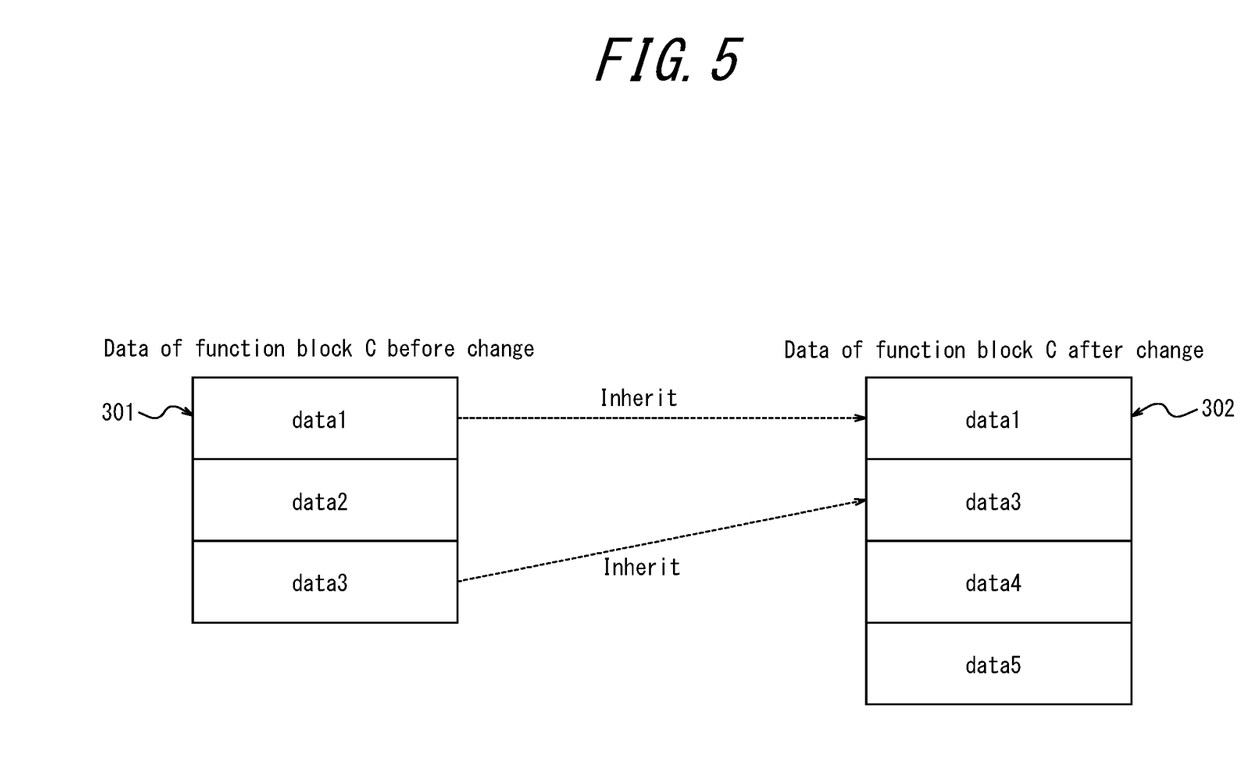
FIG. 5 illustrates data of a function block before a change being inherited as data of a function block after the change.

Subsequently, operations of the data copy program 155 are described with reference to FIG. 5. FIG. 5 illustrates data 301 of the function block C before the change and data 302 of the function block C after the change at the time the function block C is changed.

The data 301 of the function block C before the change indicates data of the function block instance corresponding to the function block C before the change. The data 302 of the function block C after the change indicates data of the function block instance corresponding to the function block C after the change.

The data 301 of the function block C before the change includes "data1", "data2", and "data3". Due to the change in the function block C in the control application, it is assumed that "data2" is deleted and "data4" and "data5" are added to the data 302 of the function block C after the change.

In this case, "data1" and "data3" are unchanged. The data copy program 155 therefore inherits the values of "data1" and "data3" from the old memory area to the new memory area. The data copy program 155 initializes the values of the newly added "data4" and "data5".

Upon receiving the address of the old memory area and the address of the new memory area, the data copy program 155 copies unchanged data and initializes the newly added data.

Next, the reduction of free space in the memory 22 of the target hardware 20 is described with reference to FIG. 6.

When the process in FIG. 5 is executed, a discontinuous free space 501 occurs in the data memory 22B in the target hardware. FIG. 6 illustrates this state.

The areas to which data of the function block instance is allocated in the data memory 22B in the target hardware are managed by an instance management table 402. The instance management table 402 is a table generated simultaneously with the instance address table 401.

The control service program 156 migrates the data of a function block instance capable of migration to the free space at a timing that does not affect operations of the control logic program 151 included in the executable code 157B. In the example in FIG. 6, the control service program 156 migrates the data of function block instances corresponding to function block A.function block D and function block A.function block C to the area starting at the top position of the free space 501. A continuous area may be migrated all at once or divided up by function block instance and migrated, in accordance with free time.

At this time, the control service program 156 updates the instance address table 401 and the instance management table 402. In the example illustrated in FIG. 6, the control service program 156 updates the address "0x1030" of the function block A.function block C in the instance address table 401 before migration to "0x1020". The control service program 156 also updates the address "0x1020" of the function block A.function block D in the instance address table 401 before migration to "0x1010".

Figure 6:
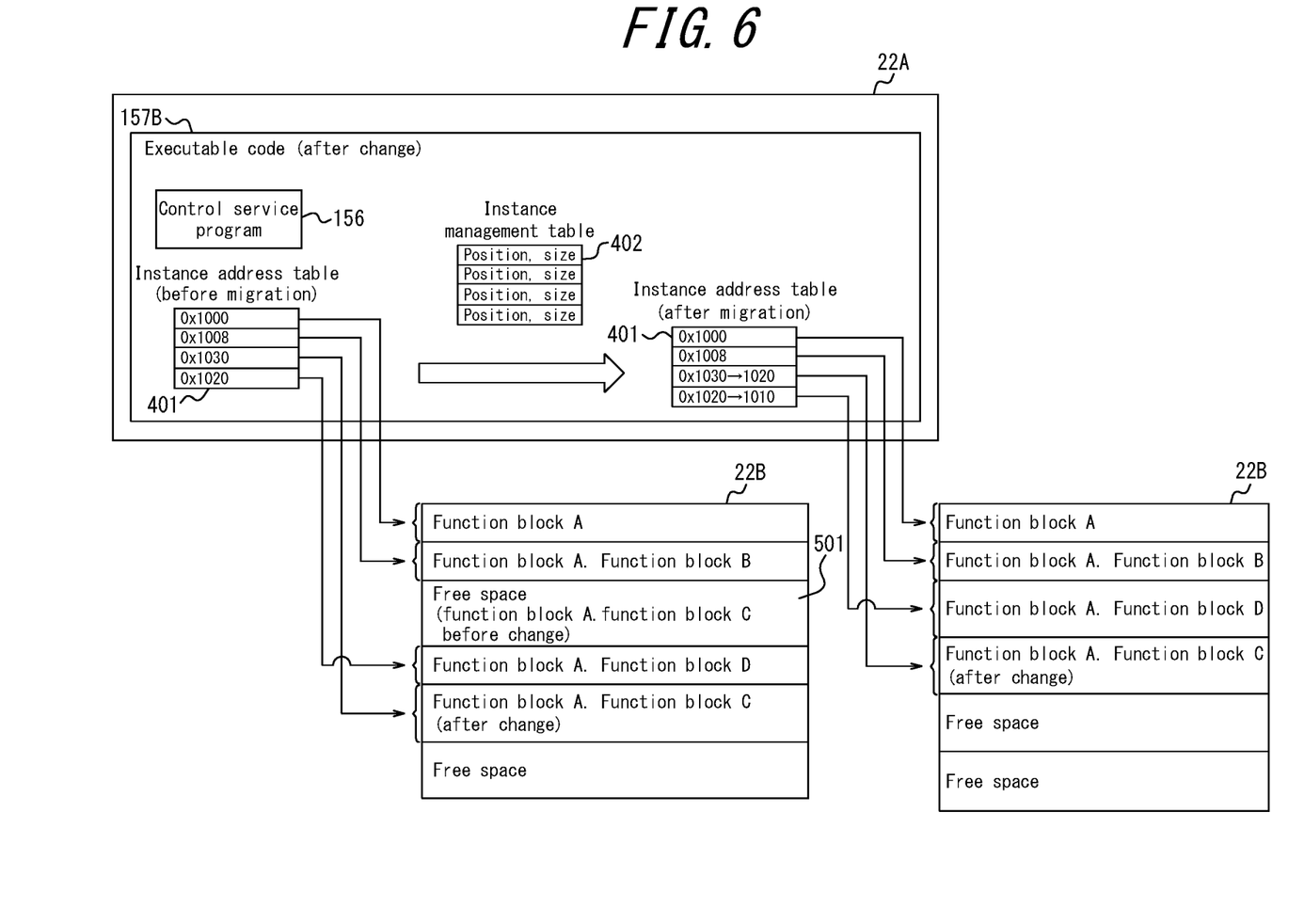
FIG. 6 illustrates the reallocation of memory areas on target hardware.

Consequently, as illustrated in FIG. 6, the discontinuous free space 501 in the data memory 22B in the target hardware is moved to the end of the data memory 22B in the target hardware. The amount of memory consumed in the data memory 22B of the target hardware can therefore be reduced.

Furthermore, the control logic program 151 included in the executable code 157B refers to the data memory 22B in the target hardware via the instance address table 401. Therefore, the data referred to by the control logic program 151 is consistent before and after migration of the data of the function block instance.

Figure 7:
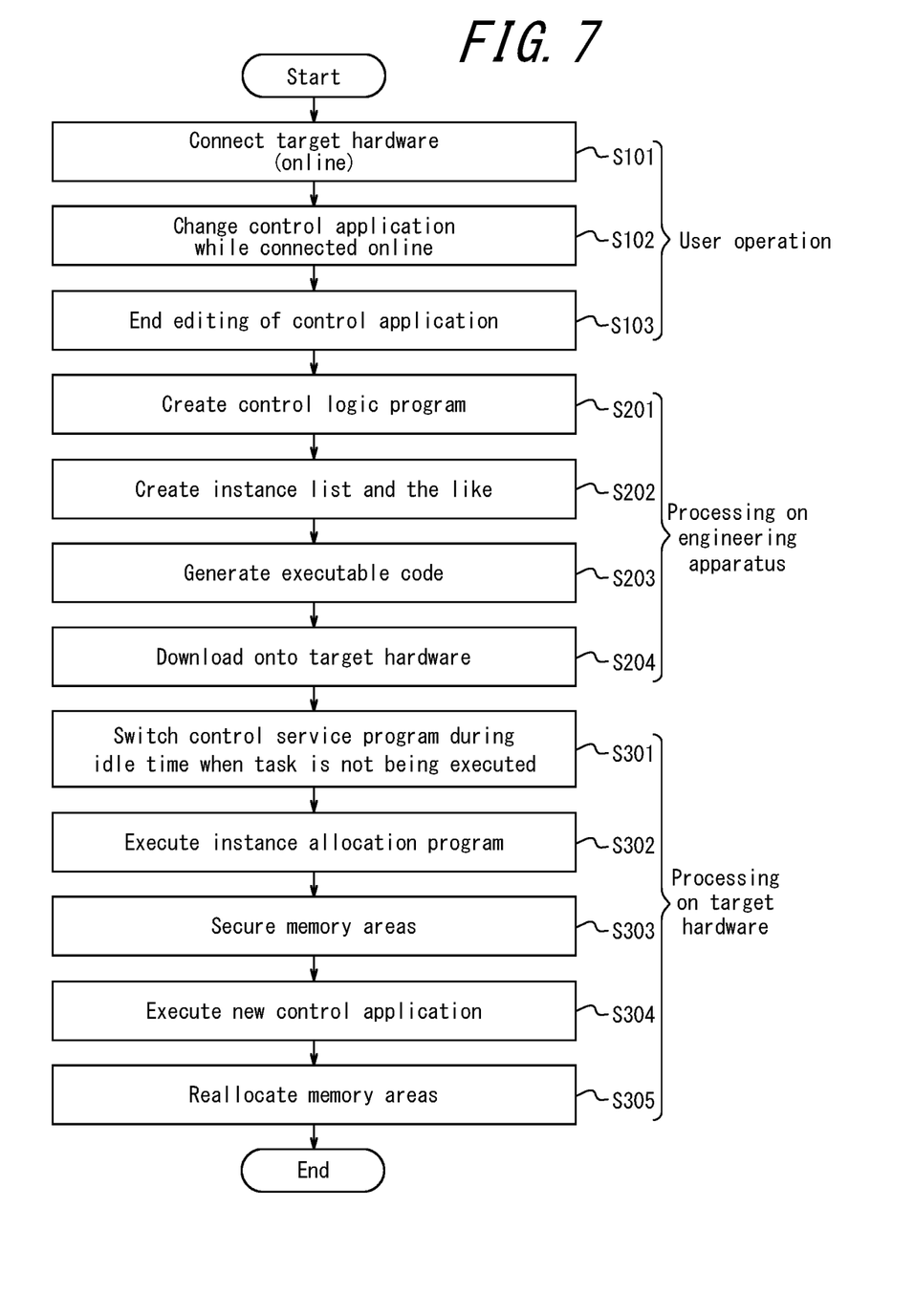
FIG. 7 is a flowchart illustrating an example of the overall processing flow in a control system.

Next, the overall processing flow in the control system 1 is described with reference to the flowchart of FIG. 7. Steps S101 to S103 indicate operations by the user of the engineering apparatus 10. Steps S201 to S204 indicate processing on the engineering apparatus 10. Steps S301 to S305 indicate processing on the target hardware 20.

The user of the engineering apparatus 10 connects the target hardware 20 to the engineering apparatus 10, so that the target hardware 20 is connected online to the engineering apparatus 10 (step S101).

While the target hardware 20 is connected online to the engineering apparatus 10, the user operates the editor UI 101 and changes the control application (step S102).

After finishing the desired changes, the user ends the editing of the control application by the editor UI 101 (step S103).

When editing of the control application ends, the algorithm converter 102 of the engineering apparatus 10 creates the control logic program 151 based on the control application after the change (step S201).

Based on the control application after the change, the instance management unit 103 of the engineering apparatus 10 creates the instance list 152, the edit instance list 153, the instance allocation program 154, and the data copy program 155 (step S202). The process of step S202 may be executed in parallel with the process of step S201.

The compiler/linker 104 compiles the control logic program 151, the instance list 152, the edit instance list 153, the instance allocation program 154, and the data copy program 155 and also links the control service program 156 to generate the executable code 157 (step S203). The compiler/linker 104 may execute a static link to link the control service program 156 in the engineering apparatus 10 or may execute a dynamic link to link the control service program 156 installed in advance on the target hardware 20.

The engineering apparatus 10 downloads the generated executable code 157 onto the target hardware 20 (step S204).

When the executable code 157 is downloaded, the target hardware 20 switches from operations by the control service program 156 included in the executable code 157 before the change to the control service program 156 included in the executable code 157 after the change during idle time when the task is not being executed (step S301).

The control service program 156 causes the instance allocation program 154 and the data copy program 155 to be executed (step S302).

The control service program 156 secures an area in the memory 22 of the target hardware 20 for the changed function block instance (step S303).

The target hardware 20 executes the new control application, i.e. the control logic program 151 included in the executable code 157 after the change (step S304).

The control service program 156 causes the data copy program 155 to reallocate memory areas in the memory 22 of the target hardware 20 during idle time when the executable code 157 is not being executed on the target hardware 20 (step S305). For example, the control service program 156 causes the data copy program 155 to reallocate memory areas so that a discontinuous free space where the function block instance was stored before the change is moved to the end of the memory 22 in the target hardware 20.

This engineering apparatus 10 according to an embodiment allows a portion of executable code generated from a general-purpose high-level language (second programming language) to be changed easily while the executable code is running. In greater detail, when the control application is edited on the engineering apparatus 10 while the engineering apparatus 10 and the target hardware 20 are connected online, the instance management unit 103 generates lists for control application switching and programs for control application switching. The lists and the programs are expressed in the second programming language. The compiler/linker 104 generates the executable code 157 based on the lists for control application switching, the programs for control application switching, and the control service program. When the executable code 157 is downloaded onto the target hardware 20, the control service program 156 causes the program for control application switching to be executed on the target hardware 20. By the control service program 156 executing the program for switching the control application on the target hardware 20 in this way, a portion of the data used by the executable code 157 before the change can easily be inherited, and a portion of the executable code 157 can easily be changed, while the executable code 157 is running.

When switching the executable code 157, the engineering apparatus 10 does not change the areas in the memory 22 of the target hardware 20 for function block instances not changed by the change to the executable code 157. For the changed function block instance, the engineering apparatus 10 copies inherited data from the memory area before the change to the memory area after the change when switching the executable code 157. This minimizes the migration of data when the executable code 157 is switched. The engineering apparatus 10 can therefore quickly switch the executable code 157 and reduce consumption of the memory 22 of the target hardware 20.

The instance list 152 and edit instance list 153 that are data necessary for data inheritance, along with the instance allocation program 154, data copy program 155, and control service program 156 that are programs necessary for data inheritance, are embedded in the executable code 157. This makes it unnecessary to store data and programs necessary for data inheritance in the memory 22 of the target hardware 20. Consumption of the memory 22 of the target hardware 20 can therefore be reduced.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are included therein.

For example, the arrangement, number, and the like of the above-described components are not limited to the above explanation or the drawings. The arrangement, number, and the like of each component may be selected freely as long as the functions of the component can be achieved.

The invention claimed is:

1. An engineering apparatus for generating executable code from a control application, created in a first programming language, for controlling target hardware, the executable code causing the target hardware to operate, the engineering apparatus comprising:
a processor configured to:
generate, when the control application is edited while the engineering apparatus and the target hardware are connected online, a list for control application switching and a program for control application switching, wherein the list for control application switching and the program for control application switching are generated from the control application and expressed in a second programming language; and
generate the executable code based on the list for control application switching, the program for control application switching, and a control service program;
wherein when the executable code is downloaded onto the target hardware, the control service program causes the program for control application switching to be executed on the target hardware, and
wherein the list for control application switching comprises:
an instance list including size information of function block instances included in the control application; and
an edit instance list including information related to a changed function block instance among the function block instances included in the control application.

2. The engineering apparatus of claim 1, wherein the program for control application switching comprises:
an instance allocation program configured to manage memory areas where the function block instances included in the control application are stored in a memory of the target hardware; and
a data copy program configured to copy inherited data for the changed function block instance from a memory area where the changed function block instance was stored before being changed to a memory area where the changed function block instance is stored after being changed.

3. The engineering apparatus of claim 2, wherein the control service program is configured to reallocate a memory area during idle time when the executable code is not being executed on the target hardware, and wherein the memory area is free space where the changed function block instance was stored before being changed.

4. A control method of an engineering apparatus for generating executable code from a control application, created in a first programming language, for controlling target hardware, the executable code causing the target hardware to operate, the control method comprising:

generating, when the control application is edited while the engineering apparatus and the target hardware are connected online, a list for control application switching and a program for control application switching, wherein the list for control application switching and the program for control application switching are generated from the control application and expressed in a second programming language; and generating the executable code based on the list for control application switching, the program for control application switching, and a control service program;

wherein when the executable code is downloaded onto the target hardware, the control service program causes the program for control application switching to be executed on the target hardware, and wherein the list for control application switching comprises:

an instance list including size information of function block instances included in the control application; and an edit instance list including information related to a changed function block instance among the function block instances included in the control application.

5. A non-transitory computer-readable storage medium with an executable program stored thereon, wherein the executable program controls an engineering apparatus for generating executable code from a control application, created in a first programming language, for controlling target hardware, the executable code causing the target hardware to operate, the executable program causing the engineering apparatus to:

generate, when the control application is edited while the engineering apparatus and the target hardware are connected online, a list for control application switching and a program for control application switching, wherein the list for control application switching and the program for control application switching are generated from the control application and expressed in a second programming language; and generate the executable code based on the list for control application switching, the program for control application switching, and a control service program;

wherein when the executable code is downloaded onto the target hardware, the control service program causes the program for control application switching to be executed on the target hardware, and wherein the list for control application switching comprises:

an instance list including size information of function block instances included in the control application; and an edit instance list including information related to a changed function block instance among the function block instances included in the control application.

* * * * *